US008544269B2

(12) United States Patent
Takahashi et al.

(10) Patent No.: US 8,544,269 B2
(45) Date of Patent: Oct. 1, 2013

(54) ENGINE

(75) Inventors: Takeshi Takahashi, Osaka (JP);
Hidenori Nomura, Osaka (JP); Kazuki Maetani, Osaka (JP); Terumitsu Takahata, Osaka (JP); Takao Kawabe, Osaka (JP); Kazuhiro Takenaka, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 174 days.

(21) Appl. No.: 13/122,831

(22) PCT Filed: Sep. 17, 2009

(86) PCT No.: PCT/JP2009/066246
§ 371 (c)(1),
(2), (4) Date: Apr. 6, 2011

(87) PCT Pub. No.: WO2010/041544
PCT Pub. Date: Apr. 15, 2010

(65) Prior Publication Data
US 2011/0192161 A1    Aug. 11, 2011

(30) Foreign Application Priority Data

Oct. 7, 2008  (JP) .................................. 2008-260868

(51) Int. Cl.
*F02B 33/44* (2006.01)
*F02B 33/00* (2006.01)
*F02B 37/00* (2006.01)
*F02B 37/013* (2006.01)
*F02B 37/18* (2006.01)
*F02D 23/00* (2006.01)
*F02M 25/07* (2006.01)

(52) U.S. Cl.
USPC ............ 60/612; 60/602; 60/605.1; 60/605.2; 123/562

(58) Field of Classification Search
USPC ............ 60/612, 602, 605.1, 605.2; 123/562
IPC ............................... F02B 37/00, 37/013, 37/18
See application file for complete search history.

(56) References Cited

U.S. PATENT DOCUMENTS 4,955,199 A * 9/1990 Kawamura ...................... 60/612
4,958,497 A * 9/1990 Kawamura ...................... 60/612
(Continued)

FOREIGN PATENT DOCUMENTS

JP   2005-315163        11/2005
JP   2005-330811 A      12/2005
(Continued)

OTHER PUBLICATIONS

A Certified English Transalation of Fujiwara et al. (Pub. Number JP 2005-315163 A), published on Nov. 10, 2005.*
(Continued)

*Primary Examiner* — Thai Ba Trieu
(74) *Attorney, Agent, or Firm* — Sterne, Kessler, Goldstein & Fox P.L.L.C.

(57) ABSTRACT

An engine (100) provided with a variable series supercharging system (7) composed of a high-pressure supercharger (10) and a low-pressure supercharger (20), a supercharging pressure sensor (63) for detecting the pressure of intake air pressurized by the variable series supercharging system (7), a high-pressure supercharger rotation sensor (61) for detecting the rotational speed of the high-pressure supercharger (10), a variable actuator (14) for adjusting the capacity of the high-pressure supercharger (10), and a control device (60) capable of controlling the variable actuator (14). The control device (60) controls the variable actuator (14) based on detection signals from the supercharging pressure sensor (63) and the high-pressure supercharger rotation sensor (61).

13 Claims, 7 Drawing Sheets

(56) References Cited

U.S. PATENT DOCUMENTS

| | | | | |
|---|---|---|---|---|
| 5,105,624 | A * | 4/1992 | Kawamura | 60/612 |
| 5,873,248 | A * | 2/1999 | Houtz | 60/602 |
| 5,974,801 | A * | 11/1999 | Houtz | 60/602 |
| 7,775,043 | B2 * | 8/2010 | Funke et al. | 60/602 |
| 8,201,406 | B2 * | 6/2012 | Kogo et al. | 60/612 |
| 2007/0289302 | A1 * | 12/2007 | Funke et al. | 60/602 |
| 2010/0263638 | A1 * | 10/2010 | Kogo et al. | 123/562 |
| 2012/0210710 | A1 * | 8/2012 | Chevalier et al. | 60/602 |
| 2012/0210711 | A1 * | 8/2012 | Petrovic et al. | 60/602 |
| 2013/0074492 | A1 * | 3/2013 | Chi et al. | 60/602 |

FOREIGN PATENT DOCUMENTS

| | | |
|---|---|---|
| JP | 2006-029110 A | 2/2006 |
| JP | 2006-266216 A | 10/2006 |
| JP | 2008-008202 A | 1/2008 |

OTHER PUBLICATIONS

A Machine translation of Ishikawa (Pub. Number JP 2006-266216 A), published on Oct. 5, 2006.*

A Machine translation of Hiriuchi (Pub. Number JP 2008-008202 A), published on Jan. 17, 2008.*

A Machine translation of Endo et al. (Pub. Number JP 2006-029110 A), published on Feb. 2, 2006.*

The Notice of Reasons for Refusal for related Japanese Appl. No. 2008-260868, Japanese Patent Office, mailed May 8, 2012, 4 pgs. (including translation).

International Search Report for PCT/JP2009/066246, Japanese Patent Office, mailed Nov. 24, 2009, 2 pages.

* cited by examiner

ENGINE

TECHNICAL FIELD

The present invention relates to an art of control of an engine having a variable series supercharging system.

BACKGROUND ART

Conventionally, an engine having a series supercharging system is known as an engine having a plurality of superchargers. In the series supercharging system, turbines of the superchargers rotated by receiving exhaust gas are arranged in series in one exhaust path, and compressors of the superchargers compressing intake air are arranged in series in one intake path.

A variable capacity type supercharger is also known in which exhaust gas is controlled suitably its flow rate and then introduced into a turbine constituting the supercharger so as to improve supercharging efficiency. A series supercharging system in which two superchargers compress intake air flowing in one exhaust path and at least one of the superchargers is variable capacity type is defined as a variable series supercharging system. The Patent Literature 1 discloses an engine having a variable series supercharging system.

Conventionally, in control of capacity in a variable capacity type supercharger, feedback control is performed with supercharging pressure detected by a supercharging pressure sensor. However, the supercharging pressure is indirect physical quantity about the action of the supercharger and is disadvantageous because the control of capacity of the supercharger cannot be performed accurately. Especially, the variable series supercharging system having the variable capacity type superchargers is disadvantageous because the control of capacity cannot be performed accurately further.

Patent Literature 1: the Japanese Patent Laid Open Gazette 2006-29110

DISCLOSURE OF INVENTION

Problems to be Solved by the Invention

Then, the purpose of the present invention is to provide an engine and a control method which can control accurately a variable series supercharging system.

Means for Solving the Problems

Explanation will be given on means of the present invention for solving the problems.

According to the first aspect of the present invention, an engine in which intake air guided by one intake path is distributed to cylinders, and exhaust gas collected from the cylinders is discharged through one exhaust path includes a variable series supercharging system having a high-pressure supercharger and a low-pressure supercharger each of which is constituted by a turbine rotated by receiving the exhaust gas flowing in the exhaust path and a compressor driven by the turbine so as to compress the intake air flowing in the intake path, a supercharging pressure sensor detecting pressure of the intake air compressed by the variable series supercharging system, a high-pressure supercharger rotation sensor detecting high-pressure supercharger rotation speed of the high-pressure supercharger, a high-pressure supercharger variable actuator controlling capacity of the high-pressure supercharger, and a control device enabling the high-pressure supercharger variable actuator to be controlled. The control device controls the high-pressure supercharger variable actuator based on detection signals from the supercharging pressure sensor and the high-pressure supercharger rotation sensor.

According to the second aspect of the present invention, the engine according to the first aspect further includes a bypass path bypassing exhaust gas from an upstream side of a turbine constituting the high-pressure supercharger to a downstream side of the turbine, a bypasses flow rate control valve controlling flow rate of the exhaust gas flowing in the bypass path, and a control device enabling the high-pressure supercharger variable actuator and the bypasses flow rate control valve to be controlled. The control device controls the high-pressure supercharger variable actuator and the bypasses flow rate control valve based on detection signals from the supercharging pressure sensor and the high-pressure supercharger rotation sensor.

According to the third aspect of the present invention, the engine according to the first aspect further includes a low-pressure supercharger rotation sensor detecting low-pressure supercharger rotation speed of the low-pressure supercharger, a low-pressure supercharger variable actuator controlling capacity of the low-pressure supercharger, and a control device enabling the low-pressure supercharger variable actuator to be controlled. The control device controls the low-pressure supercharger variable actuator based on detection signals from the supercharging pressure sensor and the low-pressure supercharger rotation sensor.

According to the fourth aspect of the present invention, the engine according to the third aspect further includes a bypass path bypassing exhaust gas from an upstream side of a turbine constituting the high-pressure supercharger to a downstream side of the turbine, a bypasses flow rate control valve controlling flow rate of the exhaust gas flowing in the bypass path, and a control device enabling the low-pressure supercharger variable actuator and the bypasses flow rate control valve to be controlled. The control device controls the low-pressure supercharger variable actuator and the bypasses flow rate control valve based on detection signals from the supercharging pressure sensor and the low-pressure supercharger rotation sensor.

According to the fifth aspect of the present invention, the engine according to the third aspect further includes a bypass path bypassing exhaust gas from an upstream side of a turbine constituting the high-pressure supercharger to a downstream side of the turbine, a bypasses flow rate control valve controlling flow rate of the exhaust gas flowing in the bypass path, an EGR path guiding a part of the exhaust gas flowing in the exhaust path to the intake path, an EGR valve controlling flow rate of the exhaust gas flowing in the EGR path, and a control device enabling the EGR valve to be controlled. The control device calculates the flow rate of the exhaust gas flowing in the EGR path based on detection signals from the supercharging pressure sensor, the high-pressure supercharger rotation sensor and the low-pressure supercharger rotation sensor, and controls the EGR valve according to a result of the calculation.

Effect of the Invention

The present invention constructed as the above brings the following effects.

According to the first aspect of the present invention, the capacity of the supercharger is controlled while employing the supercharging pressure and the high-pressure supercharger rotation speed as feedback values, whereby the variable series supercharging system can be controlled accurately.

According to the second aspect of the present invention, the capacity of the supercharger and the opening degree of the bypasses flow rate control valve are controlled while employing the supercharging pressure and the high-pressure supercharger rotation speed as feedback values, whereby the variable series supercharging system can be controlled accurately further.

According to the third aspect of the present invention, the capacity of the supercharger is controlled while employing the supercharging pressure and the low-pressure supercharger rotation speed as feedback values, whereby the variable series supercharging system can be controlled accurately.

According to the fourth aspect of the present invention, the capacity of the supercharger and the opening degree of the bypasses flow rate control valve are controlled while employing the supercharging pressure and the low-pressure supercharger rotation speed as feedback values, whereby the variable series supercharging system can be controlled accurately further.

According to the fifth aspect of the present invention, the capacity of the supercharger and the opening degree of the bypasses flow rate control valve are controlled while employing the supercharging pressure, the high-pressure supercharger rotation speed and the low-pressure supercharger rotation speed as feedback values, whereby the variable series supercharging system can be controlled accurately. The flow rate of exhaust gas flowing in the EGR path can be calculated, whereby the EGR valve can be controlled accurately.

THE BEST MODE FOR CARRYING OUT THE INVENTION

Next, explanation will be given on the embodiments of the present invention.

Figure 1:
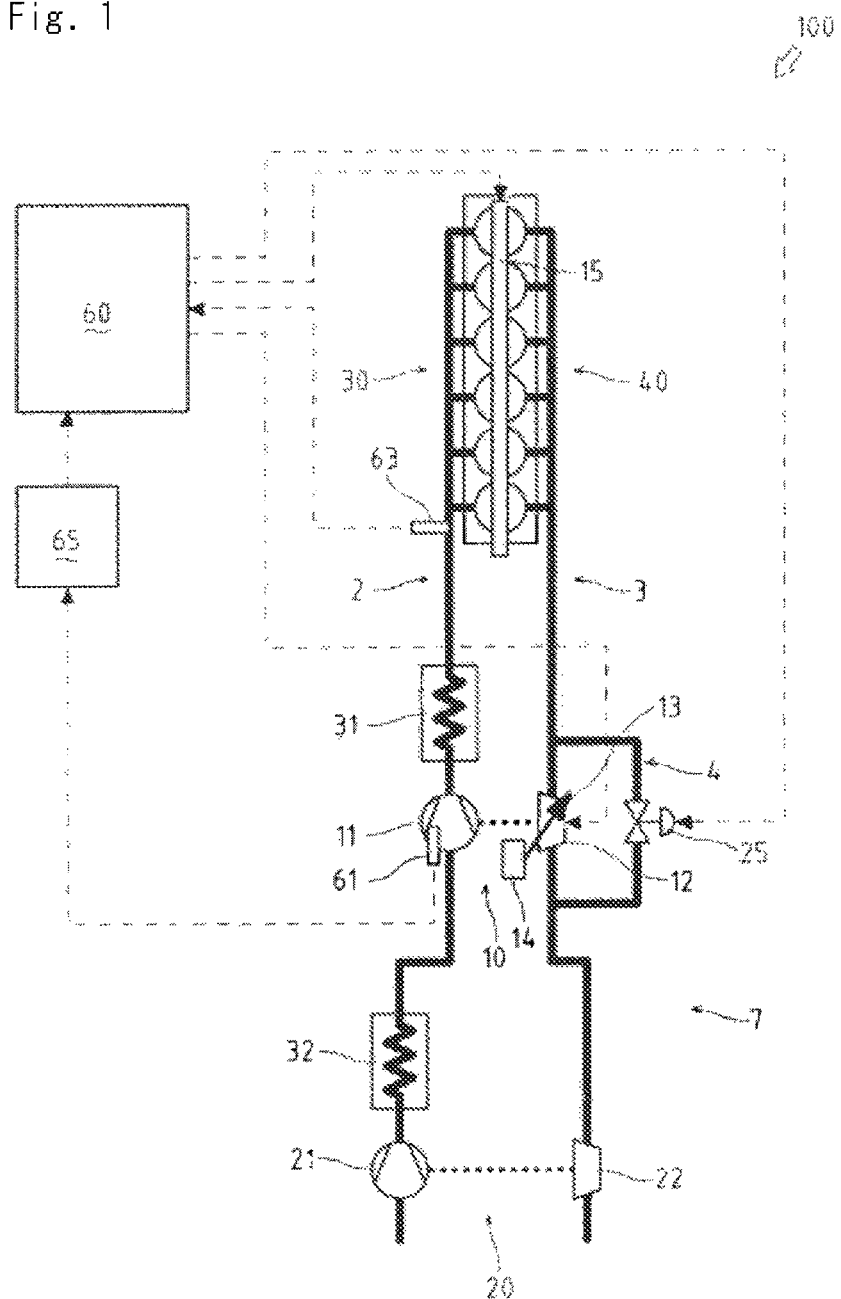
FIG. 1 is a schematic drawing of entire construction of an engine according to a first embodiment of the present invention.
Figure 2:
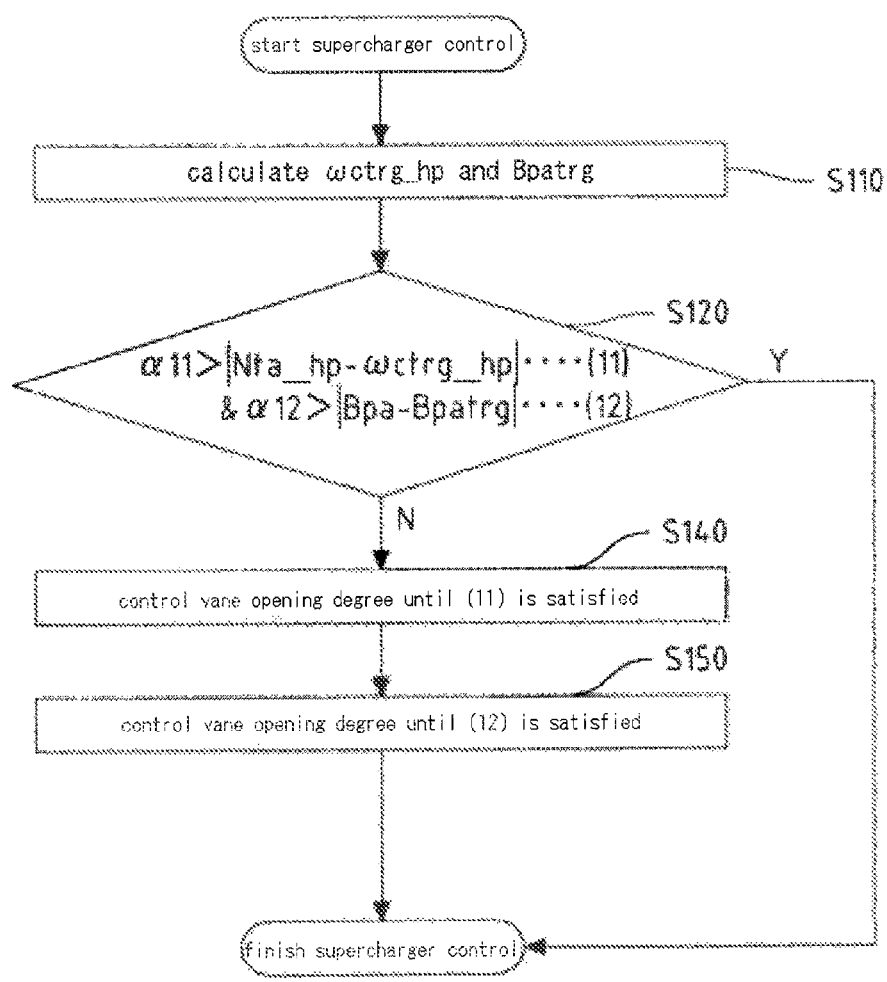
FIG. 2 is a flow chart of a control flow of the engine according to the first embodiment of the present invention.
Figure 3:
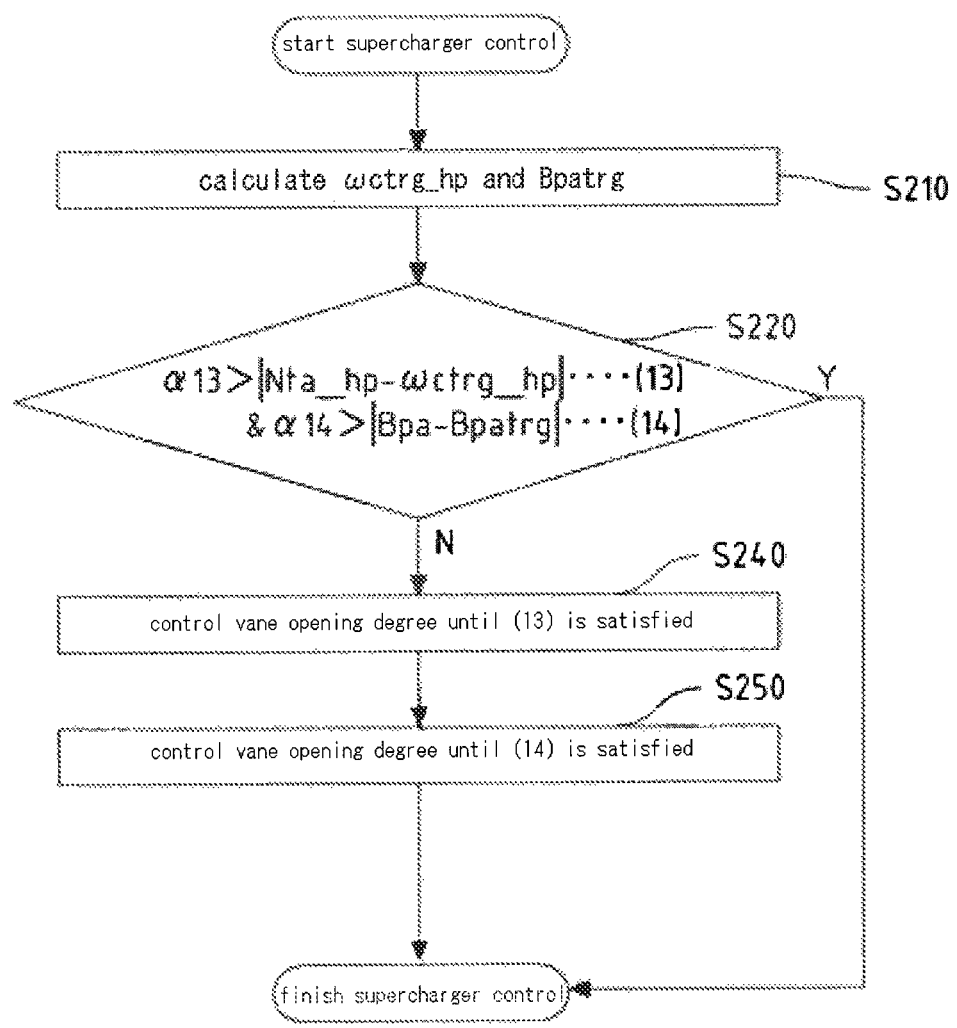
FIG. 3 is a flow chart of another control flow of the engine according to the first embodiment of the present invention.
Figure 4:
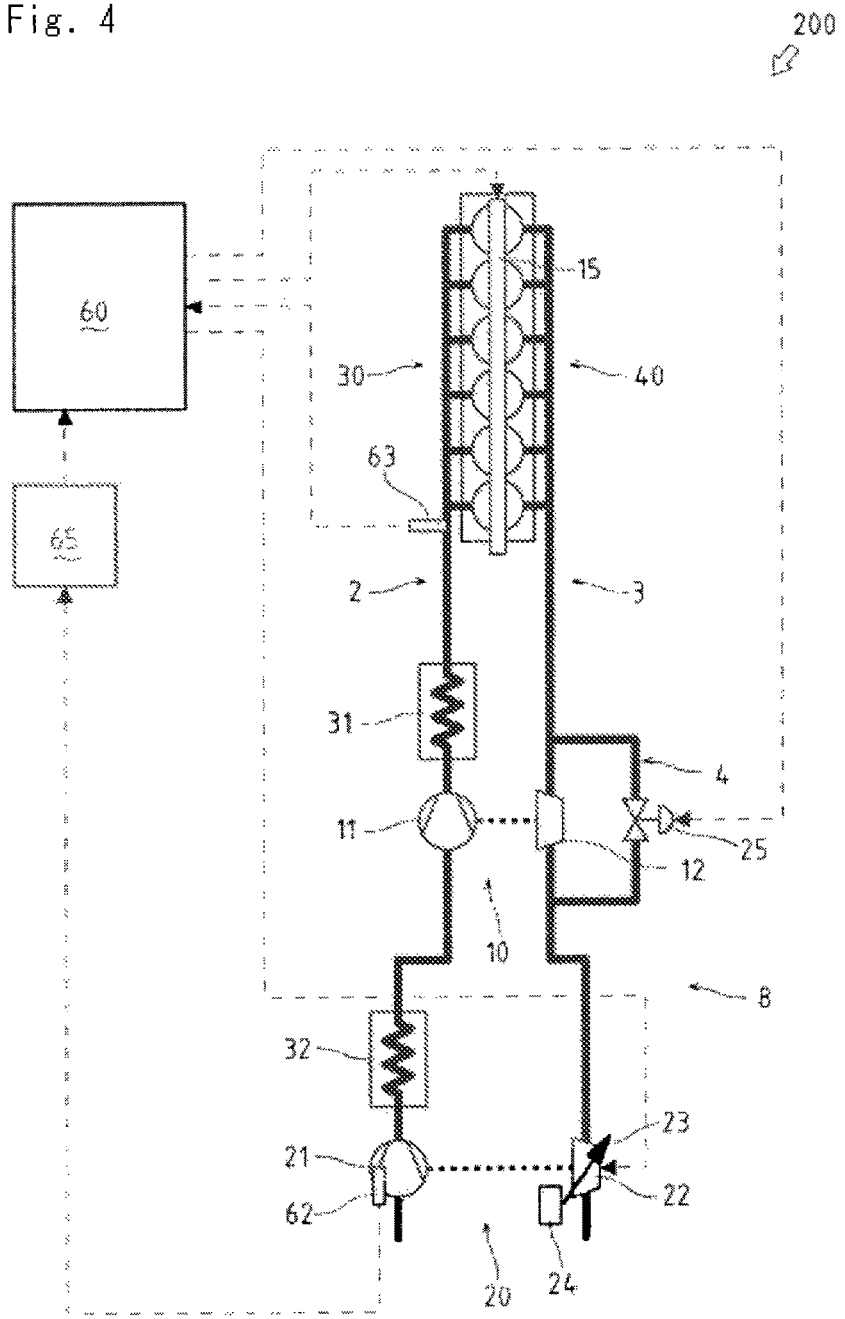
FIG. 4 is a schematic drawing of entire construction of an engine according to a second embodiment of the present invention.
Figure 5:
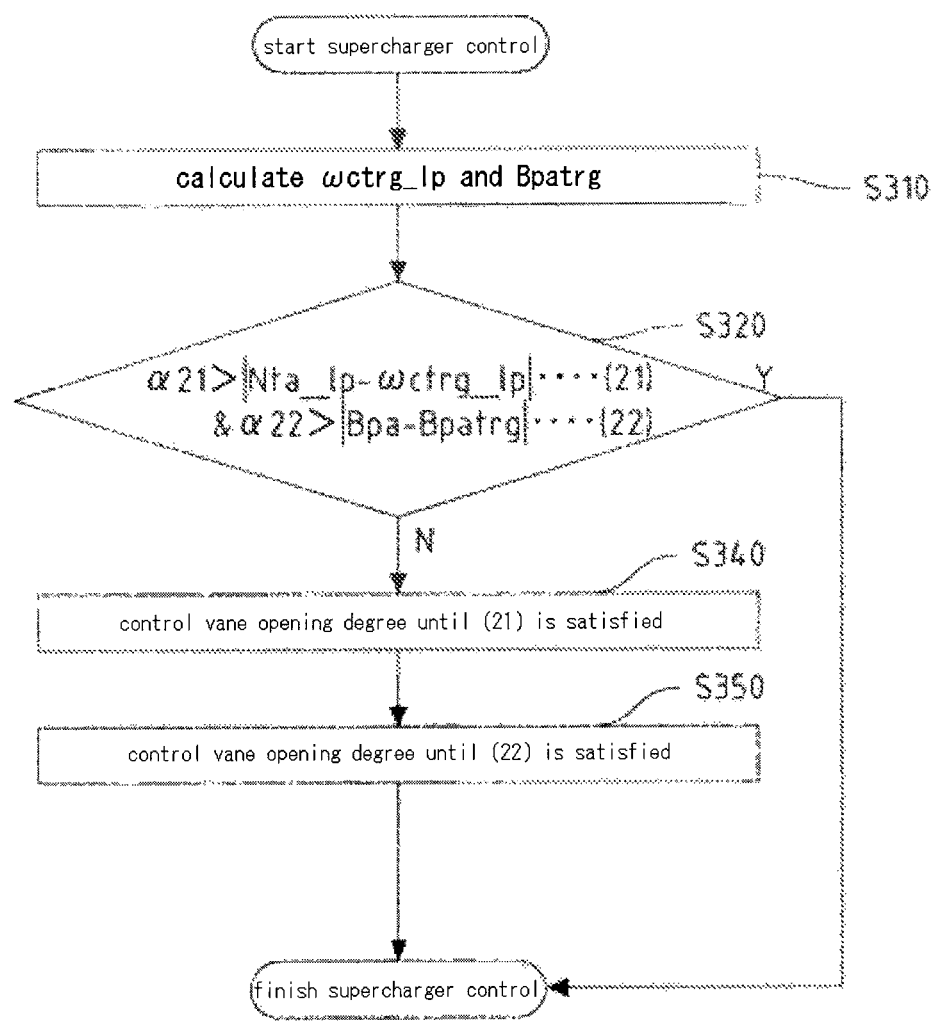
FIG. 5 is a flow chart of a control flow of the engine according to the second embodiment of the present invention.
Figure 6:
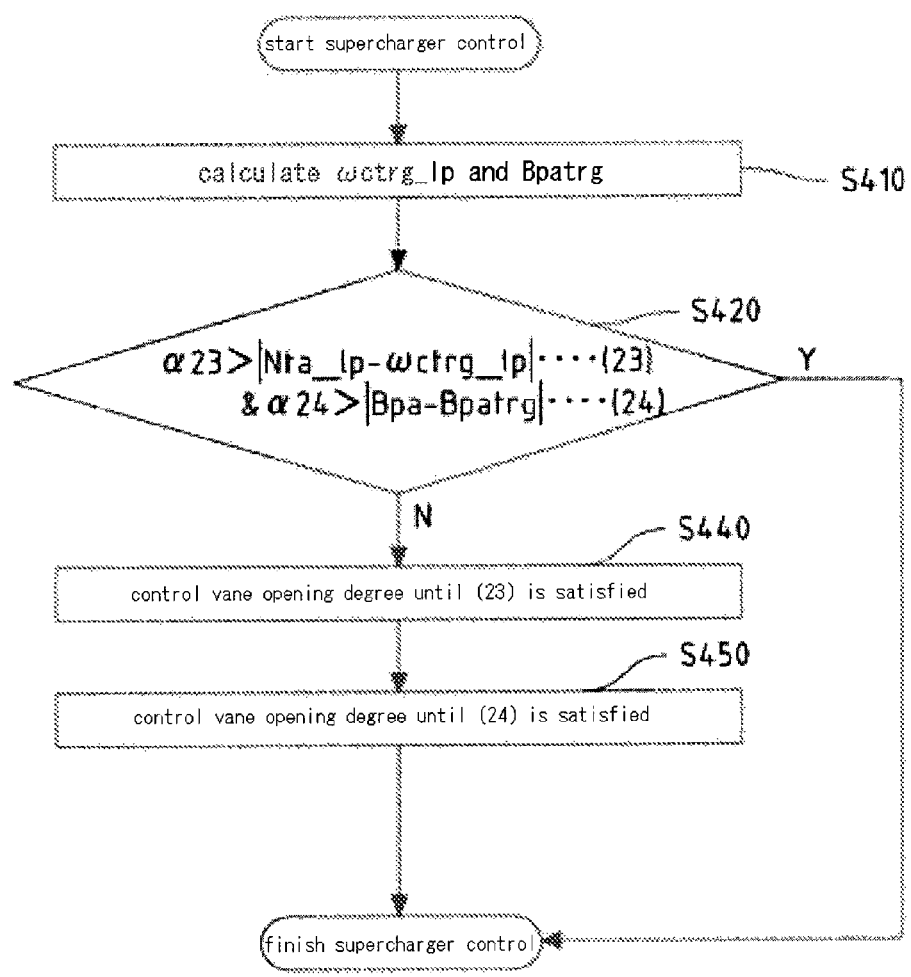
FIG. 6 is a flow chart of another control flow of the engine according to the second embodiment of the present invention.
Figure 7:
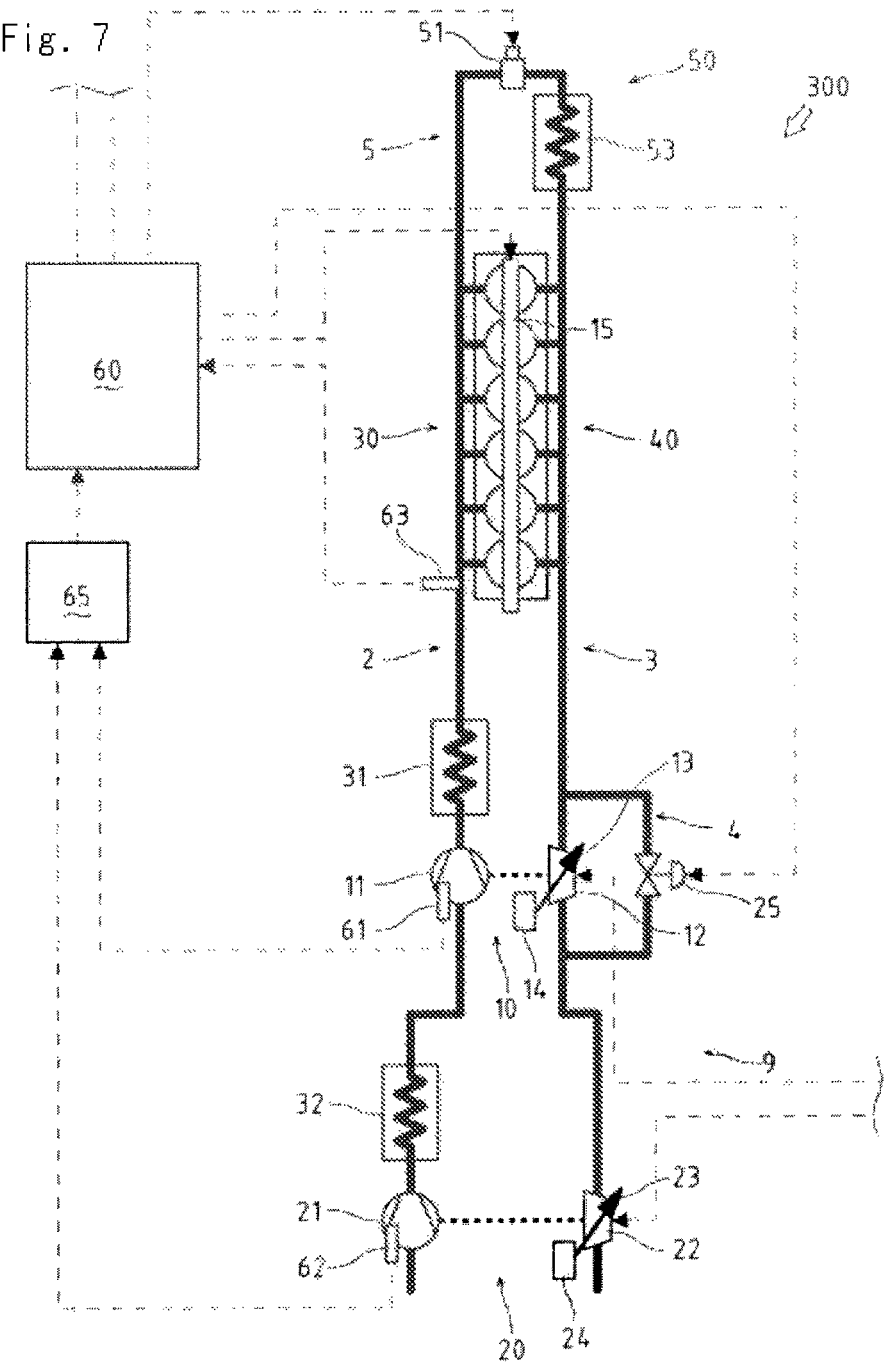
FIG. 7 is a schematic drawing of entire construction of an engine according to a third embodiment of the present invention.

FIG. 1 is a schematic drawing of entire construction of an engine 100 according to a first embodiment of the present invention. FIG. 2 is a flow chart of a control flow of the engine 100 according to the first embodiment of the present invention. FIG. 3 is a flow chart of another control flow. FIG. 4 is a schematic drawing of entire construction of an engine 200 according to a second embodiment of the present invention. FIG. 5 is a flow chart of a control flow of the engine 200 according to the second embodiment of the present invention. FIG. 6 is a flow chart of another control flow. FIG. 7 is a schematic drawing of entire construction of an engine 300 according to a third embodiment of the present invention.

Embodiment 1

Firstly, explanation will be given on the engine 100 according to the first embodiment of the present invention. The engine 100 according to the first embodiment of the present invention is a direct injection type 6-cylindered engine and mainly includes an intake manifold 30 to which an intake path 2 is connected, an exhaust manifold 40 to which an exhaust path 3 is connected, and a common rail type fuel injection device (hereinafter, referred to as fuel injection device) 15.

The engine 100 includes a variable series supercharging system 7 having a high-pressure supercharger 10 and a low-pressure supercharger 20. The high-pressure supercharger 10 includes a turbine 12 rotationally driven by receiving exhaust gas flowing in the exhaust path 3 and a compressor 11 rotationally driven by the turbine 12 so as to compress intake air flowing in the intake path 2. The low-pressure supercharger 20 includes a turbine 22 rotationally driven by receiving exhaust gas flowing in the exhaust path 3 and a compressor 21 rotationally driven by the turbine 22 so as to compress intake air flowing in the intake path 2. The compressor 11 of the high-pressure supercharger 10 is arranged downstream the compressor 21 of the low-pressure supercharger 20, and the turbine 12 of the high-pressure supercharger 10 is arranged upstream the turbine 22 of the low-pressure supercharger 20.

The high-pressure supercharger 10 is a variable capacity type supercharger and has a high-pressure supercharger variable actuator 14. The high-pressure supercharger variable actuator 14 controls vane opening degree by controlling a variable vane 13 provided in the high-pressure supercharger 10. Accordingly, flow rate of exhaust gas introduced into the turbine 12 can be controlled suitably, whereby supercharging efficiency is improved in wide drive range.

In the intake path 2, from the upstream side toward the intake manifold 30, the compressor 21 of the low-pressure supercharger 20 and an intercooler 32 cooling intake air compressed in the compressor 21 are arranged. At the downstream side of these members, the compressor 11 of the high-pressure supercharger 10 and an intercooler 31 cooling intake air compressed in the compressor 11 are arranged.

In the exhaust path 3, from the exhaust manifold 40 toward the downstream side, the turbine 12 of the high-pressure supercharger 10 is arranged, and at the downstream side thereof, the turbine 22 of the low-pressure supercharger 20 is arranged. A bypass path 4 is provided which bypasses exhaust gas from the upstream side to the downstream side of the turbine 12 constituting the high-pressure supercharger 10, and a bypasses flow rate control valve 25 is provided in the middle portion of the bypass path 4.

A control device 60 mainly includes a central processing unit and a storage device. The control device 60 is electrically connected through an amplifier 65 to a high-pressure supercharger rotation sensor 61 provided in the high-pressure supercharger 10. The control device 60 is electrically connected to a supercharging pressure sensor 63 provided in the intake manifold 30 and the other sensors, forms control signals based on electric signals from the sensors, and outputs the control signals to the high-pressure supercharger variable actuator 14 and the like. Hereinafter, the control of the variable vane 13 of the high-pressure supercharger 10 and the control of the bypasses flow rate control valve 25 by the control device 60 are defined as supercharger control.

Explanation will be given on the supercharger control of the engine 100 according to the first embodiment of the present invention referring to FIG. 2. The control device 60 controls the variable vane 13 of the high-pressure supercharger 10 so as to enable the high-pressure supercharger 10 to compress intake air the most efficiently in the case that the driving state of the engine 100 is at low speed rotation and low load state, that is, at low output driving state.

Firstly, the control device 60 calculates a target high-pressure supercharger rotation speed ωctrg_hp and a target supercharging pressure Bpatrg (S110).

The target high-pressure supercharger rotation speed ωctrg_hp is the rotation speed of the compressor 11 at which intake air can be compressed the most efficiently in the high-pressure supercharger 10, and is calculated based on the target supercharging pressure Bpatrg, a map stored in the storage device of the control device 60 and the like.

The target supercharging pressure Bpatrg is the supercharging pressure at which fuel combustion following the driving state of the engine 100 can be optimized, and is calculated based on a map stored in the storage device of the control device 60 and the like.

The control device 60 judges as condition (11) whether the absolute value of the difference between a high-pressure supercharger rotation speed Nta_hp detected by the high-pressure supercharger rotation sensor 61 and the target high-pressure supercharger rotation speed ωctrg_hp is smaller than a predetermined value α11, and judges as condition (12) whether a supercharging pressure Bpa detected by a supercharging pressure sensor 63 and the target supercharging pressure Bpatrg is smaller than a predetermined value α12 (S120).

In the case that the conditions (11) and (12) are satisfied at S120, the control device 60 judges that the high-pressure supercharger rotation speed Nta_hp is the supercharger rotation speed of the high-pressure supercharger 10 at which intake air can be compressed the most efficiently in the variable series supercharging system 7 and the supercharging pressure Bpa is the most suitable supercharging pressure to the fuel combustion.

On the other hand, in the case that the condition (11) or (12) is not satisfied at S120, the control device 60 judges that the high-pressure supercharger rotation speed Nta_hp is not the supercharger rotation speed at which intake air can be compressed the most efficiently or that the supercharging pressure Bpa is not the most suitable supercharging pressure to the fuel combustion.

Then, the control device 60 controls the variable vane 13 of the high-pressure supercharger 10 so as to control the vane opening degree until the condition (11) is satisfied (S140). Subsequently, the control device 60 controls the variable vane 13 of the high-pressure supercharger 10 so as to control the vane opening degree until the condition (12) is satisfied (S150).

As mentioned above, the variable vane 13 of the high-pressure supercharger 10 is controlled while employing the high-pressure supercharger rotation speed Nta_hp and the supercharging pressure Bpa as feedback values, whereby the variable series supercharging system 7 can be controlled accurately.

Next, explanation will be given on another supercharger control of the engine 100 according to the first embodiment of the present invention referring to FIG. 3.

The control device 60 controls the variable vane 13 so that the high-pressure supercharger 10 can compress intake air the most efficiently in the case that the driving state of the engine 100 is shifting from the low output driving state to the high rotation and high load state, that is, the high output driving state. The control device 60 controls the bypasses flow rate control valve 25 so as to realize the optimum supercharging pressure for the fuel combustion.

The control device 60 calculates a target high-pressure supercharger rotation speed ωctrg_hp and a target supercharging pressure Bpatrg (S210).

The target high-pressure supercharger rotation speed ωctrg_hp is the rotation speed of the compressor 11 at which intake air can be compressed the most efficiently in the high-pressure supercharger 10, and is calculated based on the target supercharging pressure Bpatrg, a map stored in the storage device of the control device 60 and the like.

The target supercharging pressure Bpatrg is the supercharging pressure at which fuel combustion following the driving state of the engine 100 can be optimized, and is calculated based on a map stored in the storage device of the control device 60 and the like.

The control device 60 judges as condition (13) whether the absolute value of the difference between a high-pressure supercharger rotation speed Nta_hp detected by the high-pressure supercharger rotation sensor 61 and the target high-pressure supercharger rotation speed ωctrg_hp is smaller than a predetermined value α13, and judges as condition (14) whether a supercharging pressure Bpa detected by a supercharging pressure sensor 63 and the target supercharging pressure Bpatrg is smaller than a predetermined value α14 (S220).

In the case that the conditions (13) and (14) are satisfied at S220, the control device 60 judges that the high-pressure supercharger rotation speed Nta_hp is the supercharger rotation speed of the high-pressure supercharger 10 at which intake air can be compressed the most efficiently in the variable series supercharging system 7 and the supercharging pressure Bpa is the most suitable supercharging pressure to the fuel combustion.

On the other hand, in the case that the condition (13) or (14) is not satisfied at S220, the control device 60 judges that the high-pressure supercharger rotation speed Nta_hp is not the supercharger rotation speed of the high-pressure supercharger 10 at which intake air can be compressed the most efficiently or that the supercharging pressure Bpa is not the most suitable supercharging pressure to the fuel combustion.

Then, the control device 60 controls the bypasses flow rate control valve 25 so as to control the vane opening degree until the condition (13) is satisfied (S240). Subsequently, the control device 60 controls the bypasses flow rate control valve 25 so as to control the vane opening degree until the condition (14) is satisfied (S250).

As mentioned above, the variable vane 13 of the high-pressure supercharger 10 and the bypasses flow rate control valve 25 are controlled while employing the high-pressure supercharger rotation speed Nta_hp and the supercharging pressure Bpa as feedback values, whereby the variable series supercharging system 7 can be controlled accurately.

The high-pressure supercharger rotation speed Nta_hp directly concerned with the action of the high-pressure supercharger 10 is employed as the feedback value, whereby time lag in the supercharger control can be reduced. Accordingly, occurrence of overshoot in which the supercharging pressure Bpa is more than the target supercharging pressure Bpatrg and undershoot in which the supercharging pressure Bpa is less than the target supercharging pressure Bpatrg can be reduced. The high-pressure supercharger rotation speed Nta_hp is employed as the feedback value, whereby accurate control can be performed without considering dispersion of products of the high-pressure supercharger 10.

Furthermore, in the case that the high-pressure supercharger rotation speed Nta_hp of the high-pressure supercharger 10 is larger than the predetermined value, the overspeed can be prevented by increasing the opening degree of the bypasses flow rate control valve 25. Accordingly, the rotation speed of the high-pressure supercharger 10 is prevented from being larger than the maximum permissible rotation speed so as to improve the safety, and a waste gate or the like as a safety device is made unnecessary.

Embodiment 2

Explanation will be given on another supercharger control of the engine 200 according to the second embodiment of the present invention referring to FIG. 4. The engine 200 according to the second embodiment of the present invention is a direct injection type 6-cylindered engine and mainly includes the intake manifold 30 to which the intake path 2 is connected, the exhaust manifold 40 to which the exhaust path 3 is connected, and the common rail type fuel injection device (hereinafter, referred to as fuel injection device) 15.

The engine 200 includes a variable series supercharging system 8 having the high-pressure supercharger 10 and the low-pressure supercharger 20. The high-pressure supercharger 10 includes the turbine 12 rotationally driven by receiving exhaust gas flowing in the exhaust path 3 and the compressor 11 rotationally driven by the turbine 12 so as to compress intake air flowing in the intake path 2. The low-pressure supercharger 20 includes the turbine 22 rotationally driven by receiving exhaust gas flowing in the exhaust path 3 and a compressor 21 rotationally driven by the turbine 22 so as to compress intake air flowing in the intake path 2. The compressor 11 of the high-pressure supercharger 10 is arranged downstream the compressor 21 of the low-pressure supercharger 20, and the turbine 12 of the high-pressure supercharger 10 is arranged upstream the turbine 22 of the low-pressure supercharger 20.

The low-pressure supercharger 20 is a variable capacity type supercharger and has a low-pressure supercharger variable actuator 24. The low-pressure supercharger variable actuator 24 controls vane opening degree by controlling a variable vane 23 provided in the low-pressure supercharger 20. Accordingly, flow rate of exhaust gas introduced into the turbine 22 can be controlled suitably, whereby supercharging efficiency is improved in wide drive range.

In the intake path 2, from the upstream side toward the intake manifold 30, the compressor 21 of the low-pressure supercharger 20 and the intercooler 32 cooling intake air compressed in the compressor 21 are arranged. At the downstream side of these members, the compressor 11 of the high-pressure supercharger 10 and the intercooler 31 cooling intake air compressed in the compressor 11 are arranged.

In the exhaust path 3, from the exhaust manifold 40 toward the downstream side, the turbine 12 of the high-pressure supercharger 10 is arranged, and at the downstream side thereof, the turbine 22 of the low-pressure supercharger 20 is arranged. The bypass path 4 is provided which bypasses exhaust gas from the upstream side to the downstream side of the turbine 12 constituting the high-pressure supercharger 10, and a bypasses flow rate control valve 25 is provided in the middle portion of the bypass path 4.

A control device 60 mainly includes a central processing unit and a storage device. The control device 60 is electrically connected through the amplifier 65 to a low-pressure supercharger rotation sensor 62 provided in the low-pressure supercharger 20. The control device 60 is electrically connected to the supercharging pressure sensor 63 provided in the intake manifold 30 and the other sensors, forms control signals based on electric signals from the sensors, and outputs the control signals to the low-pressure supercharger variable actuator 24 and the like. Hereinafter, the control of the variable vane 23 of the low-pressure supercharger 20 and the control of the bypasses flow rate control valve 25 by the control device 60 are defined as supercharger control.

Explanation will be given on the supercharger control of the engine 200 according to the first embodiment of the present invention referring to FIG. 2. The control device 60 controls the variable vane 23 of the low-pressure supercharger 20 so as to enable the low-pressure supercharger 20 to compress intake air the most efficiently in the case that the driving state of the engine 200 is at low speed rotation and low load state, that is, at low output driving state.

Firstly, the control device 60 calculates a target low-pressure supercharger rotation speed $\omega ctrg\_lp$ and a target supercharging pressure Bpatrg (S310).

The target low-pressure supercharger rotation speed $\omega ctrg\_lp$ is the rotation speed of the compressor 21 at which intake air can be compressed the most efficiently in the low-pressure supercharger 20, and is calculated based on the target supercharging pressure Bpatrg, a map stored in the storage device of the control device 60 and the like.

The target supercharging pressure Bpatrg is the supercharging pressure at which fuel combustion following the driving state of the engine 200 can be optimized, and is calculated based on a map stored in the storage device of the control device 60 and the like.

The control device 60 judges as condition (21) whether the absolute value of the difference between a low-pressure supercharger rotation speed Nta_lp detected by the high-pressure supercharger rotation sensor 61 and the target low-pressure supercharger rotation speed $\omega ctrg\_lp$ is smaller than a predetermined value $\alpha 21$, and judges as condition (22) whether a supercharging pressure Bpa detected by the supercharging pressure sensor 63 and the target supercharging pressure Bpatrg is smaller than a predetermined value $\alpha 22$ (S320).

In the case that the conditions (21) and (22) are satisfied at S320, the control device 60 judges that the low-pressure supercharger rotation speed Nta_lp is the supercharger rotation speed of the low-pressure supercharger 20 at which intake air can be compressed the most efficiently in the variable series supercharging system 8 and the supercharging pressure Bpa is the most suitable supercharging pressure to the fuel combustion.

On the other hand, in the case that the condition (21) or (22) is not satisfied at S320, the control device 60 judges that the low-pressure supercharger rotation speed Nta_lp is not the supercharger rotation speed of the low-pressure supercharger 20 at which intake air can be compressed the most efficiently or that the supercharging pressure Bpa is not the most suitable supercharging pressure to the fuel combustion.

Then, the control device 60 controls the variable vane 23 of the low-pressure supercharger 20 so as to control the vane opening degree until the condition (21) is satisfied (S340). Subsequently, the control device 60 controls the variable vane 23 of the low-pressure supercharger 20 so as to control the vane opening degree until the condition (22) is satisfied (S350).

As mentioned above, the variable vane 23 of the low-pressure supercharger 20 is controlled while employing the low-pressure supercharger rotation speed Nta_lp and the supercharging pressure Bpa as feedback values, whereby the variable series supercharging system 8 can be controlled accurately.

Next, explanation will be given on another supercharger control of the engine 200 according to the second embodiment of the present invention referring to FIG. 6.

The control device 60 controls the variable vane 23 so that the low-pressure supercharger 20 can compress intake air the most efficiently in the case that the driving state of the engine 200 is shifting from the low output driving state to the high rotation and high load state, that is, the high output driving state. The control device 60 controls the bypasses flow rate control valve 25 so as to realize the optimum supercharging pressure for the fuel combustion.

The control device 60 calculates a target low-pressure supercharger rotation speed $\omega ctrg\_lp$ and a target supercharging pressure Bpatrg (S410).

The target low-pressure supercharger rotation speed $\omega ctrg\_lp$ is the rotation speed of the compressor 21 at which intake air can be compressed the most efficiently in the low-pressure supercharger 20, and is calculated based on the target supercharging pressure Bpatrg, a map stored in the storage device of the control device 60 and the like.

The target supercharging pressure Bpatrg is the supercharging pressure at which fuel combustion following the driving state of the engine 200 can be optimized, and is calculated based on a map stored in the storage device of the control device 60 and the like.

The control device 60 judges as condition (23) whether the absolute value of the difference between a low-pressure supercharger rotation speed Nta_lp detected by the low-pressure supercharger rotation sensor 62 and the target low-pressure supercharger rotation speed $\omega ctrg\_lp$ is smaller than a predetermined value $\alpha 23$, and judges as condition (24) whether a supercharging pressure Bpa detected by a supercharging pressure sensor 63 and the target supercharging pressure Bpatrg is smaller than a predetermined value $\alpha 24$ (S420).

In the case that the conditions (23) and (24) are satisfied at S420, the control device 60 judges that the low-pressure supercharger rotation speed Nta_lp is the supercharger rotation speed of the low-pressure supercharger 20 at which intake air can be compressed the most efficiently in the variable series supercharging system 8 and the supercharging pressure Bpa is the most suitable supercharging pressure to the fuel combustion.

On the other hand, in the case that the condition (23) or (24) is not satisfied at S420, the control device 60 judges that the low-pressure supercharger rotation speed Nta_lp is not the supercharger rotation speed of the low-pressure supercharger 20 at which intake air can be compressed the most efficiently or that the supercharging pressure Bpa is not the most suitable supercharging pressure to the fuel combustion.

Then, the control device 60 controls the bypasses flow rate control valve 25 so as to control the vane opening degree until the condition (23) is satisfied (S440). Subsequently, the control device 60 controls the bypasses flow rate control valve 25 so as to control the vane opening degree until the condition (24) is satisfied (S450).

As mentioned above, the variable vane 23 of the low-pressure supercharger 20 and the bypasses flow rate control valve 25 are controlled while employing the low-pressure supercharger rotation speed Nta_lp and the supercharging pressure Bpa as feedback values, whereby the variable series supercharging system 8 can be controlled accurately.

The low-pressure supercharger rotation speed Nta_lp directly concerned with the action of the low-pressure supercharger 20 is employed as the feedback value, whereby time lag in the supercharger control can be reduced. Accordingly, occurrence of overshoot in which the supercharging pressure Bpa is more than the target supercharging pressure Bpatrg and undershoot in which the supercharging pressure Bpa is less than the target supercharging pressure Bpatrg can be reduced. The low-pressure supercharger rotation speed Nta_lp is employed as the feedback value, whereby accurate control can be performed without considering dispersion of products of the low-pressure supercharger 20.

Furthermore, in the case that the low-pressure supercharger rotation speed Nta_lp of the low-pressure supercharger 20 is larger than the predetermined value, the overspeed can be prevented by increasing the opening degree of the bypasses flow rate control valve 25. Accordingly, the rotation speed of the low-pressure supercharger 20 is prevented from being larger than the maximum permissible rotation speed so as to improve the safety, and a waste gate or the like as a safety device is made unnecessary.

Embodiment 3

Explanation will be given on another supercharger control of the engine 300 according to the third embodiment of the present invention referring to FIG. 7. The engine 300 according to the third embodiment of the present invention is a direct injection type 6-cylindered engine and mainly includes the intake manifold 30 to which an intake path 2 is connected, the exhaust manifold 40 to which an exhaust path 3 is connected, and the common rail type fuel injection device (hereinafter, referred to as fuel injection device) 15.

The engine 300 includes a variable series supercharging system 9 having the high-pressure supercharger 10 and the low-pressure supercharger 20. The high-pressure supercharger 10 includes the turbine 12 rotationally driven by receiving exhaust gas flowing in the exhaust path 3 and the compressor 11 rotationally driven by the turbine 12 so as to compress intake air flowing in the intake path 2. The low-pressure supercharger includes the turbine 22 rotationally driven by receiving exhaust gas flowing in the exhaust path 3 and the compressor 21 rotationally driven by the turbine 22 so as to compress intake air flowing in the intake path 2. The compressor 11 of the high-pressure supercharger 10 is arranged downstream the compressor 21 of the low-pressure supercharger 20, and the turbine 12 of the high-pressure supercharger 10 is arranged upstream the turbine 22 of the low-pressure supercharger 20.

Each of the high-pressure supercharger 10 and the low-pressure supercharger 20 is a variable capacity type supercharger. The high-pressure supercharger 10 has the high-pressure supercharger variable actuator 14, and the low-pressure supercharger 20 has the low-pressure supercharger variable actuator 24. The high-pressure supercharger variable actuator 14 controls vane opening degree by controlling the variable vane 13 provided in the turbine 12 of the high-pressure supercharger 10. The low-pressure supercharger variable actuator 24 controls vane opening degree by controlling the variable vane 23 provided in the turbine 22 of the low-pressure supercharger 20.

The high-pressure supercharger 10 and the low-pressure supercharger 20 controls the vane opening degree by the variable actuators 14 and 24 so as to control flow rate of exhaust gas introduced into the turbines 12 and 22, whereby supercharging efficiency is improved in wide drive range.

In the intake path 2, from the upstream side toward the intake manifold 30, the compressor 21 of the low-pressure supercharger 20 and the intercooler 32 cooling intake air compressed in the compressor 21 are arranged. At the downstream side of these members, the compressor 11 of the high-pressure supercharger 10 and the intercooler 31 cooling intake air compressed in the compressor 11 are arranged.

In the exhaust path 3, from the exhaust manifold 40 toward the downstream side, the turbine 12 of the high-pressure supercharger 10 is arranged, and at the downstream side thereof, the turbine 22 of the low-pressure supercharger 20 is arranged. The bypass path 4 is provided which bypasses exhaust gas from the upstream side to the downstream side of the turbine 12 constituting the high-pressure supercharger 10, and a bypasses flow rate control valve 25 is provided in the middle portion of the bypass path 4.

An EGR device 50 mixes a part of exhaust gas as recirculating gas with intake air. The EGR device 50 includes an EGR path 5 guiding a part of exhaust gas flowing in the exhaust manifold 40 to the intake manifold 30, an EGR cooler 53 cooling exhaust gas flowing in the EGR path 5, and an EGR valve 51 controlling flow rate of recirculating gas flowing in the EGR path 5, that is, the exhaust gas.

A control device 60 mainly includes a central processing unit and a storage device. The control device 60 is electrically connected through the amplifier 65 to the high-pressure supercharger rotation sensor 61 provided in the high-pressure supercharger 10 and the low-pressure supercharger rotation sensor 62 provided in the low-pressure supercharger 20. The control device 60 is electrically connected to the supercharging pressure sensor 63 provided in the intake manifold 30 and the other sensors, forms control signals based on electric signals from the sensors, and outputs the control signals to the EGR valve 51 and the like. Hereinafter, the control of the EGR valve 51 by the control device 60 is defined as EGR control.

Explanation will be given on the EGR control of the engine 300. The control device 60 has function for calculating flow rate of recirculating gas flowing in the EGR path 5. Accordingly, recirculating gas of optimum amount corresponding to the driving state of the engine 300 can be mixed with intake air.

In the calculation of flow rate of recirculating gas, actual exhaust gas pressure is found based on the relation between rotational speed of each of the superchargers 10 and 20 previously grasped and exhaust gas pressure in the exhaust manifold 40, and then the flow rate of recirculating gas is calculated from the pressure difference between supercharging pressure and the exhaust gas pressure.

Namely, a map showing the relation between the rotational speed of each of the superchargers 10 and 20 and the exhaust gas pressure in the exhaust manifold 40 is previously stored in the control device 60, and firstly, the exhaust gas pressure in the exhaust manifold 40 corresponding to the rotational speed of each of the superchargers 10 and 20 is called. Subsequently, by comparing supercharging pressure detected by the supercharging pressure sensor 63 with the called exhaust gas pressure, the pressure difference is grasped, and flow rate of recirculating gas flowing in the EGR path 5 is calculated from the pressure difference.

Accordingly, the flow rate of recirculating gas can be calculated accurately by employing the rotational speed of each of the superchargers 10 and 20. The calculated flow rate of recirculating gas is employed as a feedback value, whereby the EGR valve 51 can be controlled accurately.

Furthermore, the control device 60 has function for calculating flow rate of exhaust gas flowing in the bypass path 4. Accordingly, the bypasses flow rate control valve 25 can be controlled so as to enable the variable series supercharging system 9 to compress intake air the most efficiently.

In the calculation of flow rate of exhaust gas flowing in the bypass path 4, based on the relation between the difference of the rotational speed of each of the superchargers 10 and 20 flow rate of exhaust gas flowing in the bypass path 4 previously grasped, the actual flow rate of exhaust gas flowing in the bypass path 4 is found.

Namely, a map showing the relation between the difference of rotational speed of each of the superchargers 10 and 20 and the flow rate of the exhaust gas flowing in the bypass path 4, and the flow rate of the exhaust gas flowing in the bypass path 4 corresponding to the difference of rotational speed of each of the superchargers 10 and 20 is called.

Accordingly, the flow rate of the exhaust gas flowing in the bypass path 4 can be calculated accurately by employing the rotational speed of each of the superchargers 10 and 20. The calculated flow rate of exhaust gas flowing in the bypass path 4 is employed as a feedback value, whereby the bypasses flow rate control valve 25 can be controlled accurately.

INDUSTRIAL APPLICABILITY

The present invention can be employed for an engine having a variable series supercharging system.

The invention claimed is:

1. An engine in which intake air guided by one intake path is distributed to cylinders, and exhaust gas collected from the cylinders is discharged through one exhaust path, comprising:
    a variable series supercharging system comprising a high-pressure supercharger and a low-pressure supercharger each comprising a turbine rotated by receiving the exhaust gas flowing in the exhaust path and a compressor driven by the turbine so as to compress the intake air flowing in the intake path;
    a supercharging pressure sensor configured to detect a pressure of the intake air compressed by the variable series supercharging system;
    a high-pressure supercharger rotation sensor configured to detect a high-pressure supercharger rotation speed of the high-pressure supercharger;
    a high-pressure supercharger variable actuator configured to control a capacity of the high-pressure supercharger; and
    a control device configured to calculate a target high-pressure supercharger rotation speed and a target pressure of the intake air compressed by the variable series supercharging system, the control device being configured to control the high-pressure supercharger variable actuator based on the detected pressure of the intake air compressed by the variable series supercharging system, the detected high-pressure supercharger rotation speed of the high-pressure supercharger, the target high-pressure supercharger rotation speed, and the target pressure of the intake air compressed by the variable series supercharging system.

2. The engine according to claim 1, further comprising:
    a bypass path bypassing exhaust gas from an upstream side of the turbine of the high-pressure supercharger to a downstream side of the turbine; and
    a bypasses flow rate control valve configured to control a flow rate of the exhaust gas flowing in the bypass path,
    wherein the control device is configured to control the bypasses flow rate control valve,
    wherein the control device is configured to control the high-pressure supercharger variable actuator and the bypasses flow rate control valve based on the detected pressure of the intake air compressed by the variable series supercharging system, the detected high-pressure supercharger rotation speed of the high-pressure supercharger, the target high-pressure supercharger rotation speed, and the target pressure of the intake air compressed by the variable series supercharging system.

3. The engine according to claim 1, further comprising:
a low-pressure supercharger rotation sensor configured to detect a low-pressure supercharger rotation speed of the low-pressure supercharger; and
a low-pressure supercharger variable actuator configured to control a capacity of the low-pressure supercharger,
wherein the control device is configured to control the low-pressure supercharger variable actuator,
wherein the control device is configured to control the low-pressure supercharger variable actuator based on the detected pressure of the intake air compressed by the variable series supercharging system, the detected low-pressure supercharger rotation speed of the low-pressure supercharger, the target low-pressure supercharger rotation speed, and the target pressure of the intake air compressed by the variable series supercharging system.

4. The engine according to claim 3, further comprising:
a bypass path bypassing exhaust gas from an upstream side of the turbine of the high-pressure supercharger to a downstream side of the turbine; and
a bypasses flow rate control valve configured to control a flow rate of the exhaust gas flowing in the bypass path,
wherein the control device is configured to control the bypasses flow rate control valve,
wherein the control device is configured to control the low-pressure supercharger variable actuator and the bypasses flow rate control valve based on the detected pressure of the intake air compressed by the variable series supercharging system, the detected low-pressure supercharger rotation speed of the low-pressure supercharger, the target low-pressure supercharger rotation speed, and the target pressure of the intake air compressed by the variable series supercharging system.

5. The engine according to claim 3, further comprising:
a bypass path bypassing exhaust gas from an upstream side of the turbine of the high-pressure supercharger to a downstream side of the turbine;
a bypasses flow rate control valve configured to control a flow rate of the exhaust gas flowing in the bypass path;
an EGR path guiding a part of the exhaust gas flowing in the exhaust path to the intake path; and
an EGR valve configured to control a flow rate of the exhaust gas flowing in the EGR path,
wherein the control device is configured to calculate the flow rate of the exhaust gas flowing in the EGR path based on the detected pressure of the intake air compressed by the variable series supercharging system, the detected high-pressure supercharger rotation speed of the high-pressure supercharger, and the detected low-pressure supercharger rotation speed of the low-pressure supercharger, and
wherein the control device is configured to control the EGR valve based on the calculated flow rate of the exhaust gas flowing in the EGR path.

6. The engine according to claim 1, wherein the target high-pressure supercharger rotation speed is based on the target pressure of the intake air compressed by the variable series supercharging system.

7. The engine according to claim 1, wherein the control device is further configured to control the high-pressure supercharger variable actuator so as to make an absolute value of a difference between the detected high-pressure supercharger rotation speed and the target high-pressure supercharger rotation speed smaller than a predetermined value.

8. The engine according to claim 1, wherein the control device is further configured to control the high-pressure supercharger variable actuator so as to make an absolute value of a difference between the detected pressure of the intake air compressed by the variable series supercharging system and the target pressure of the intake air compressed by the variable series supercharging system smaller than a predetermined value.

9. The engine according to claim 1, wherein:
the control device is configured to control the high-pressure supercharger variable actuator so as to make a first absolute value of a difference between the detected high-pressure supercharger rotation speed and the target high-pressure supercharger rotation speed smaller than a first predetermined value;
the control device is configured to control the high-pressure supercharger variable actuator so as to make a second absolute value of a difference between the detected pressure of the intake air compressed by the variable series supercharging system and the target pressure of the intake air compressed by the variable series supercharging system smaller than a second predetermined value; and
the control device is configured to control the high-pressure supercharger variable actuator such that first absolute value is made smaller than the first predetermined value before the second absolute value is made smaller than the second predetermined value.

10. An engine in which intake air guided by one intake path is distributed to cylinders, and exhaust gas collected from the cylinders is discharged through one exhaust path, comprising:
a variable series supercharging system comprising a high-pressure supercharger and a low-pressure supercharger each comprising a turbine rotated by receiving the exhaust gas flowing in the exhaust path and a compressor driven by the turbine so as to compress the intake air flowing in the intake path;
a supercharging pressure sensor configured to detect a pressure of the intake air compressed by the variable series supercharging system;
a low-pressure supercharger rotation sensor configured to detect a low-pressure supercharger rotation speed of the low-pressure supercharger;
a low-pressure supercharger variable actuator configured to control a capacity of the low-pressure supercharger; and
a control device configured to calculate a target low-pressure supercharger rotation speed and a target pressure of the intake air compressed by the variable series supercharging system, the control device being further configured to control the low-pressure supercharger variable actuator based on the detected pressure of the intake air compressed by the variable series supercharging system, the detected low-pressure supercharger rotation speed of the low-pressure supercharger, the target low-pressure supercharger rotation speed, and the target pressure of the intake air compressed by the variable series supercharging system.

11. The engine according to claim 10, further comprising:
a bypass path bypassing exhaust gas from an upstream side of the turbine of the high-pressure supercharger to a downstream side of the turbine; and
a bypasses flow rate control valve configured to control a flow rate of the exhaust gas flowing in the bypass path,
wherein the control device is configured to control the bypasses flow rate control valve, wherein the control device is configured to control the low-pressure supercharger variable actuator and the bypasses flow rate control valve based on the detected pressure of the intake air compressed by the variable series supercharging system, the detected high-pressure supercharger rotation speed of the high-pressure supercharger, the target high-pressure supercharger rotation speed, and the target pressure of the intake air compressed by the variable series supercharging system.

12. The engine according to claim 10, wherein the control device is configured to control the low-pressure supercharger variable actuator so as to make an absolute value of a difference between the detected low-pressure supercharger rotation speed and the target low-pressure supercharger rotation speed smaller than a predetermined value.

13. The engine according to claim 10, wherein the control device is configured to control the low-pressure supercharger variable actuator so as to make an absolute value of a difference between the detected pressure of the intake air compressed by the variable series supercharging system and the target pressure of the intake air compressed by the variable series supercharging system smaller than a predetermined value.

* * * * *